(12) United States Patent
Eschbach et al.

(10) Patent No.: US 6,275,304 B1
(45) Date of Patent: Aug. 14, 2001

(54) AUTOMATED ENHANCEMENT OF PRINT QUALITY BASED ON FEATURE SIZE, SHAPE, ORIENTATION, AND COLOR

(75) Inventors: Reiner Eschbach; Robert P. Loce, both of Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/219,734

(22) Filed: Dec. 22, 1998

(51) Int. Cl.[7] .............................. H04N 1/58; H04N 1/52; G06T 5/30

(52) U.S. Cl. ..................... 358/1.9; 358/534; 382/257; 382/275

(58) Field of Search ..................... 358/1.9, 534, 535, 358/536, 533, 530, 540, 518, 456, 298, 300; 382/205, 257, 275; 347/115, 116, 131, 232, 251

(56) References Cited

U.S. PATENT DOCUMENTS

| 4,149,194 | 4/1979 | Holladay . |
| 5,048,109 | 9/1991 | Bloomberg et al. . |
| 5,065,437 | * 11/1991 | Bloomberg ........................... 382/258 |
| 5,201,011 | * 4/1993 | Bloomberg et al. .................. 382/257 |
| 5,204,918 | 4/1993 | Hirosawa . |
| 5,519,109 | 5/1996 | Klassen . |
| 5,655,061 | 8/1997 | Tse et al. . |

FOREIGN PATENT DOCUMENTS

| 0160526 | 11/1985 | (EP) . |
| 0445066 | 9/1991 | (EP) . |
| 0718793 | 6/1996 | (EP) . |

* cited by examiner

*Primary Examiner*—Scott Rogers
(74) *Attorney, Agent, or Firm*—Mark Costello (57) ABSTRACT

A processing system for preparing a plural separation document image for printing, including small feature enhancement of the image, preventing halftoning damage thereto, including detecting small features in the document image; and in a detected small feature region, setting any output image signals corresponding to said small feature region to ON in at least one of the at least two separations.

21 Claims, 6 Drawing Sheets

This is 4 point text at 300 dpi in different colors
This is 4 point text at 300 dpi in different colors This is 20 p

AUTOMATED ENHANCEMENT OF PRINT QUALITY BASED ON FEATURE SIZE, SHAPE, ORIENTATION, AND COLOR

The present invention relates to the varying of colors and shape in the reproduction of various image features. Particularly, the present invention describes a method for varying the color of colored small image features, based on the size, shape, orientation or color thereof, to enhance appearance with minimal impact, or a preferential impact, on perceived color.

BACKGROUND OF THE INVENTION

Document printing in the home and in the office has evolved to incorporate color into a large number of documents. The use of color in documents has created problems in the area of printing color text, that extends to other small features in the document images. The readability of colored text is strongly influenced by the choice of color, not only due to the visual contrast between text and background, but also due to the printing process incorporating a finite set of colorants at a small number of defined local density levels.

Color in documents is the result of a combination of a limited set of colorants over a small area, in amounts selected to integrate to a desired color response. This is accomplished in many printing devices by reproducing separations of the image, where each separation provides varying amounts of a single primary colorant. When combined together with other separations, the result is a full color image.

For color images, a plurality of color separations are combined. Each color separation corresponds to a single colorant, and may be defined by a number of gray levels in excess of the capability of the printer. In such cases, each of the color separations is reduced from the input number of levels to the smaller output number of levels reproducible by the printer. The multiple color separations are combined together at printing to yield the final color print. Commonly, color documents are formed using cyan, magenta and yellow colorants or cyan, magenta, yellow and black colorants. A larger number, or alternative colorants may also be used. A color image may also be represented as sets of image planes representing quantities other than colorants. For instance, the color planes could represent parameters within a representation of color, such as L*, a* and, b* which describe lightness and two aspects of chromaticity, respectively.

In printing documents, the desired gray level over an area is commonly achieved by halftoning, where image gray level variation is represented by placing greater or lesser numbers of ON pixels in a discrete area of the image. In one halftoning method, known as dithering or screening, over a given area having a number of gray separation pixels therein, a value representing the gray level of each separation pixel of an array of gray separation pixels within the area is compared to one of a set of preselected thresholds as taught, for example, in U.S. Pat. No. 4,149,194 to Holladay. For an area where the image is gray, some of the thresholds within the dither matrix will be exceeded, i.e., the image value at that specific location is larger than the value stored in the dither matrix for that same location, while others are not. In the binary case, the image pixels or cell elements for which the thresholds are exceeded might be printed as a maximum colorant value, while the remaining separation pixels are allowed to remain white, dependent on the actual physical quantity described by the data. The described halftoning method produces an output pattern that is periodic or quasi-periodic in the spatial coordinates.

Halftoning creates problems in color document reproduction where color text and other small image features are used. One constant trade-off in color printing is between spatial resolution and color resolution. In order to reproduce a given color accurately, a comparatively large halftone cell has to be used. Large halftone cells allow more gray levels of each color, and therefore, more colors. However, the effect of this large cell is that small details can no longer be accurately rendered. The large halftone cell structure becomes visible to the eye. An impact of this phenomenon is that small colored text objects become illegible. If on the other hand, a comparably small halftone cell is chosen, the color of graphics and images is no longer accurately represented. However, if the halftones cells used to create the color are changed to smaller cells, the choice of colors becomes smaller as well, making it unlikely that the correct color can be obtained.

The problem of small color text reproduction extends to many other small features, including for example, structures in maps and other detailed illustrations, particular when such structures are in color. One notable example is the representation of a certain type of road on a map as a solid, thin colored line. If the road is improperly halftoned, the road may appear "dashed" and the original image intent is lost.

All of the references cited herein are incorporated by reference for their teachings.

SUMMARY OF THE INVENTION

In accordance with the invention, a processing system for preparing a plural separation document image for printing includes small feature enhancement of the image, preventing halftoning damage thereto. The process included detecting selected attributes in the document image, and in a detected selected attribute region, setting output image signals corresponding to said small feature region to ON, in at least one of said at least two separations. The process works particularly well for small text protection.

In accordance with one aspect of the invention, selected attributes including small features such as text may be identified by information from a page description language description of the document.

In accordance with another aspect of the present invention, selected attributes or small image features may be identified by a combination of one or more of size, shape, color, and intensity attributes.

In accordance with yet another aspect of the invention, small image features may also be identified by creating a mask identifying small feature areas of the image. By successively using erosion and dilation filters selected for detection of a size, shape, orientation, color or intensity to identify small features in the image, a mask identifying small text areas is created, and used for selecting areas of the image for halftone damage protection based on the mask.

The present invention describes a process to address the size/color choice dichotomy without the need to switch between halftone cells. This is achieved by dynamically varying the color transform as a function of the selected attributes of the image elements. In this way, small text, small graphics and lines can be subjected to a different color transform than large text, graphics or pictures. The main feature of the proposed method is the color enhancement of individual elements based on identification of their feature size, shape, and/or orientation. In one embodiment, the method enhances the color of small page elements by increasing their printability through luminance and chrominance changes. Large objects are not modified and maintain their original color. In this way, the method automatically changes the compromise between color accuracy and readability in an adaptive manner.

Any size, shape, intensity, orientation-based feature may be found through combinations of erosions and dilations. For instance, it may be desirable to identify only serifs and thin points of a stressed font (selected shapes) for modification. Alternatively, particular structures within an image, such as map symbols may be identified by shape for subsequent modification. Once identified, a mask is constructed for those structures, and pixels within and about that mask may be modified for to protect the feature by changing the color transform.

These and other aspects of the invention will become apparent from the following descriptions used to illustrate a preferred embodiment of the invention read in conjunction with the accompanying drawings in which:

Figure 1:
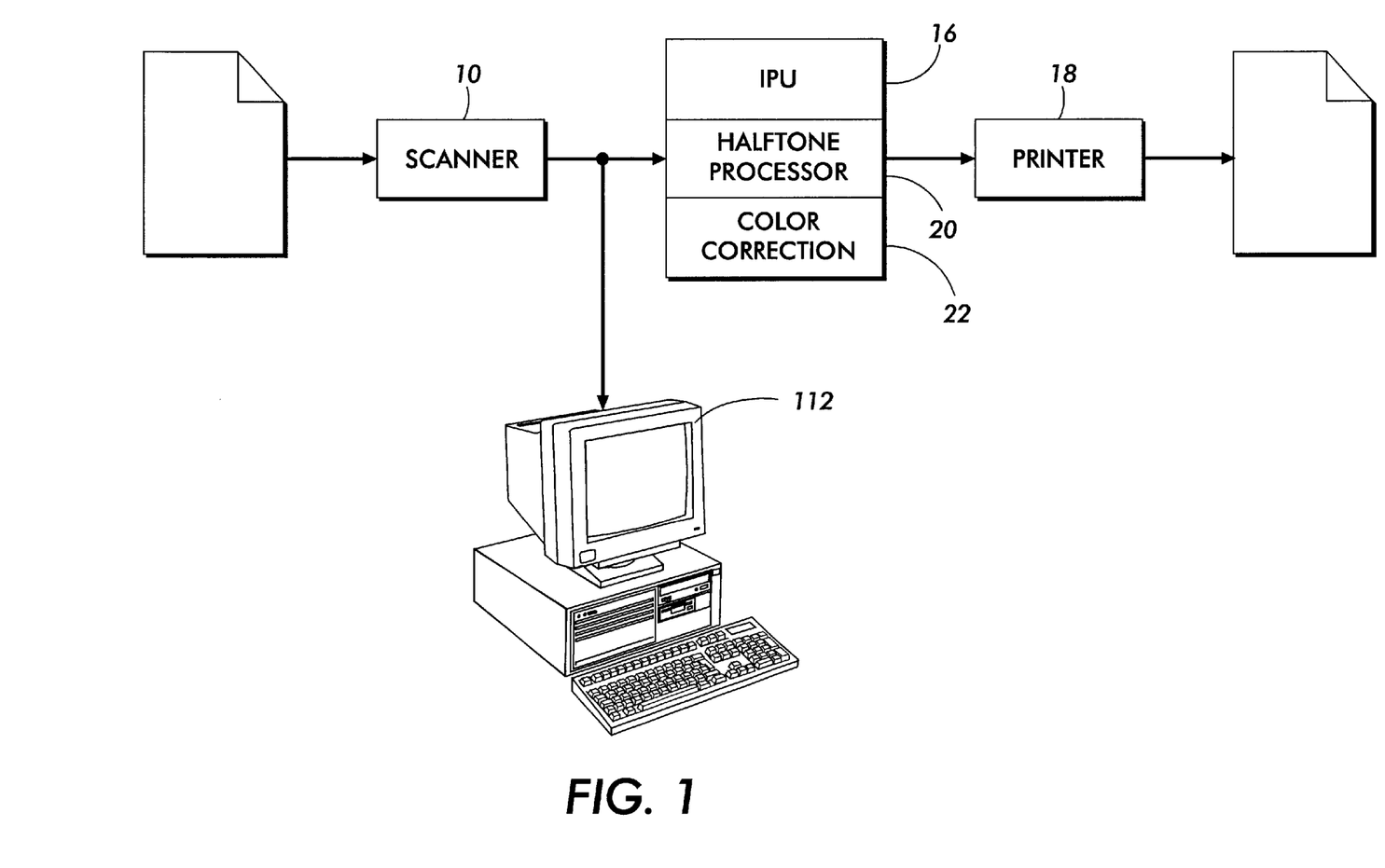
FIG. 1 is a simplified description of a system in which the present invention may find advantageous use.

Referring now to the drawings where the showings are for the purpose of describing an embodiment of the invention and not for limiting same, a basic image processing system is shown in FIG. 1. In the present case, continuous tone or contone image data may be characterized as image signals, each pixel of which is defined at a single level or optical density in a set of 'c' optical density levels, the number of members in the set of levels being larger than desired. Each pixel will be processed in the manner described hereinbelow, to redefine each pixel in terms of a new, smaller set of 'd' levels. In this process, 'c' and 'd' are integer values representing pixel depth, or a number of signal levels at which the pixel may appear. One common case of this method includes the conversion of data from a relatively large set of contone levels to one of two legal or allowed binary levels for printing in a binary printer.

The term "halftone" is used here to refer any deterministic or non-stochastic method of processing image data initially defined at 'c' optical density levels to a new, smaller set of 'd' levels. As used herein, the term "dot" refers to a product or an image resulting from a screening process. A "screen cell", as used herein, refers to the set of pixels which together will form the dot, while the term "screen matrix" will be used to describe the set of values which together make up the set of thresholds to be applied to a contone image to arrive at the dot. A "pixel" refers to an image signal associated with a particular position in an image, having a density between zero-value state and a maximum intensity state. Accordingly, pixels are defined by intensity and position. A dot is made up of a plurality of pixels. While printers print individual pixels (sometimes referred to as "spots"), screening methods sometime cluster the pixels together into a dot. Dots of clustered pixels have better reproduction characteristics on some printing hardware than dots of unclustered pixels. If standard screening or dithering processes are used, the image will thereafter have a frequency or halftone repetition period, and angle associated with it.

In the particular system to be discussed, documents are represented by a set of image signals. A "color image" is a document including at least two separations of image signals, each set (or separation) represented by an independent channel, which is usually processed independently, although certain processes do require knowledge of other channels. Each set of signals or separation is used to drive the printer to reproduce an image, perhaps with different colorants, so that a final image can be obtained, which may comprise multiple separations superposed. A "color image" is therefore a document including at least two separations, such as in the Xerox 4850 Highlight Color Printer and commonly three or four separations, such as in the Xerox DocuColor 40 or sometimes more than four separations. One possible digital copier (a scanner/printer combination) is described for example, U.S. Pat. No. 5,655,061 or U.S. Pat. No. 5,659,634 incorporated herein by reference.

As used herein, "gray", as used herein does not refer to a color unless specifically identified as such. Rather, the term refers to image signals that vary between maximum and minimum, irrespective of the color of the separation in which the signals are used.

Each document provides a set of image signals or pixels that will drive a printer to produce an image. In the case of multicolor printers, the separations, superposed together, form the color image. In this context, we will describe color pixels as combination of separation pixels representing gray levels of each separation in a document image in a given small area thereof.

Screening may be described for simplicity as the addition of a set of selected screen values to image signals within a defined area of the image, in conjunction with a uniform application of a threshold level(s) to the combined values. The process of screening may also be represented by a set of varying thresholds defined at locations corresponding to pixels over a given area of the image. A screen cell is generally smaller than the total image and will be replicated in a predetermined scheme for processing the image in order to cover an area of the image (at a frequency associated with the cell size). The output of a process using a screen cell is a set of pixels, defined by a set of levels having a number of members less than the input set of values. Commonly, the set of d-bit output values is binary, either black or white, or a spot or no spot, although the values might be gray. The binary output of a single halftone cell is a set of pixels that are either black or white, which together form a "dot".

With reference now to FIG. 1, which shows a general system requirement representing the goal of the invention, an electronic representation of a document (hereinafter, an image) from image input terminal such as scanner 10 derives electronic digital data in some manner, in a format related to the physical characteristics of the device, and commonly with pixels defined at c bits per pixel. Common scanners, such, for example, produce 8 bit/pixel data, at resolutions acceptable for many purposes. If this is a color document, the image is defined with two or more separation bitmaps, usually with similar resolution and pixel depth. Data from scanner 10 may be directed on for processing directly, or to an appropriately programmed general purpose computer 12, or the like. Alternatively, the source of image data may be the appropriately programmed general purpose computer. The electronic image signals are directed through an image processing unit (IPU) 16 to be processed so that an image suitable for reproduction on image output terminal or printer 18 is obtained. Image processing unit 16 commonly includes a color conversion unit 22 which converts the 3 component color description to the printer specific 4 or more component color description, and a halftoner 20 which converts a c bit digital image signals to d bit digital image signals, suitable for driving a particular printer, where c and d are integer values. IPU 16 may be part of the printer, or part of a general purpose computer. It may include special purpose hardware, or merely represent appropriate programs running on the general purpose computer. It may also represent special purpose programs running on a remote computer. Additionally, it may include a decomposer program for generating bitmap images from PDL described images.

A "common" approach in rendering different objects is the use of different or halftones for different objects. A drawback of this method is the need for a page segmentation (or object classification for a page description language or PDL input) which requires a relatively large computational overhead. Additionally, misclassifications often result in severe artifacts. Also, changing halftone frequencies for different objects on a page can cause problems in all places where the different halftone frequencies abut. The current way around this problem is the use of specially designed halftone dot, such as for example discussed in U.S. patent application, Ser. No. 081786,470 by Wang that offer the best compromise between fine detail and image rendering.

The present invention demonstrates a method that can be used in combination with all halftone dots, without the need to switch between different halftones for rendering of small or large features. Generally, areas of text are identified, and tested to determine if they contain small features which would be severely degraded by halftone edge jaggedness. If the area contains only large features, slight jaggedness might be tolerable. For the purposes of this discussion, "small" refers to image features, details or objects, which are impacted negatively by the use of halftones at edges of the features, details, or objects. Alternatively, it might be said that the comparative size of the halftone cell being used and the feature, detail or object is such that jagged edges produced by the halftone cell are so significant that they become visible as defects to the eye of the viewer.

The jaggedness of colored features, details or objects is caused by the halftoning process. Every color that is not full ON (or full OFF) will produce a halftone dot that must be printed with separations, and potentially with unfilled or jagged edges. Here and in the following, we will use the terms ON to mean that either the separation is fully ON, or that the output of the halftoning process for said separation is indistinguishable from the output obtained from a fully ON separation, e.g.: if an input of 243 produces the same halftoned output as an input of 255 (fully ON ), level 243 is considered ON for the description of this patent. It should be noted that fully ON might have different digital values dependent on color space, additive/subtractive color system, etc. If visually, the edge is smooth, then we have met the requirement of the invention, even if the actual separation has not be set to saturation. To eliminate the roughness problem, the inventive halftoning process provides for at least one of the three colors (4 for c,m,y,k) to be "pushed" to full ON to maintain the outline of the font. This process can be explained by the following pseudo code for an r, g, b representation of an image:

If colored feature is identified to be below a certain size then:
  for each pixel
  find min of red, green, blue
  set min=0
  next pixel end Note that a separation would be fully saturated in such a color space at min=0. All of the pixels in a given halftone cell will be ON, or colored. If the image has already been converted to a c,m,y,k density representation of the image, the process is changed to operate on one of the four colors and provides for pushing the max to 255. Note, the value does not have to be fully ON or OFF. A density or intensity that is sufficient to obtain the same jaggedness mitigation by mostly filling edges of halftone cells, meets the terms of the invention. At high density or intensity values the edge appearance could be the same or similar enough to edge appearance noted when using a fully saturated value.

With this process, all gray-colored small features will be mapped to solid black or to a level that yields preferable feature rendition. For example, all reddish text (or text with red separation nearest to a minimum compared to the other separations) will be changed to contain a fully saturated red separation halftone cell (thus, in this case, becoming somewhat redder). Optionally, the other colors of the input can also be modified, e.g., they can be mapped to one of a few permitted colors like 0, 128 and 255.

Figure 2A:
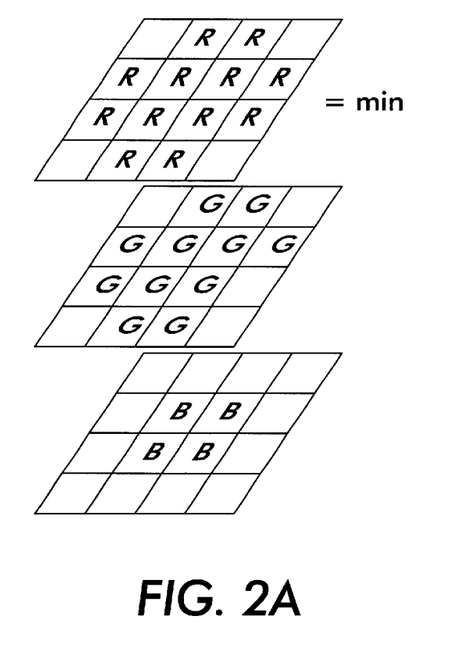
FIGS. 2A and 2B show a device that is operative to include the invention.
Figure 2B:
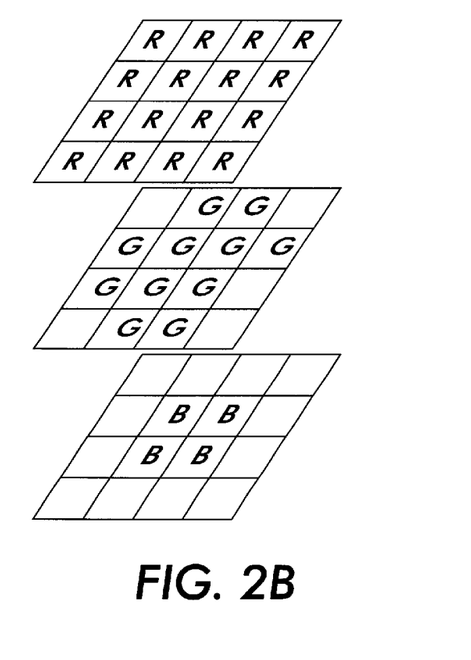

Importantly, even though the color is wrong, from a colorimetric sense, it is not so wrong that it is immediately noticeable. The resulting color will be closely related to the called-for color. More importantly, the human visual system is very limited when it does not have a suitable references coupled with recognition precision for small features. A simplistic view of a halftone dot, shown with all three separations, before and after the procedure is shown at FIGS. 2A and 2B. FIG. 2A shows the red separation as the min separation, and FIG. 2B shows the filled halftone dot set=0.

Of course, multiple separations can be set to zero as well. Additionally, while the minimum valued separation has been set to zero in the example, to have a minimum calorimetric impact, other separations can be chosen, with their own colorimetric impact. Users may select differing colorimetric impacts.

Figure 3:
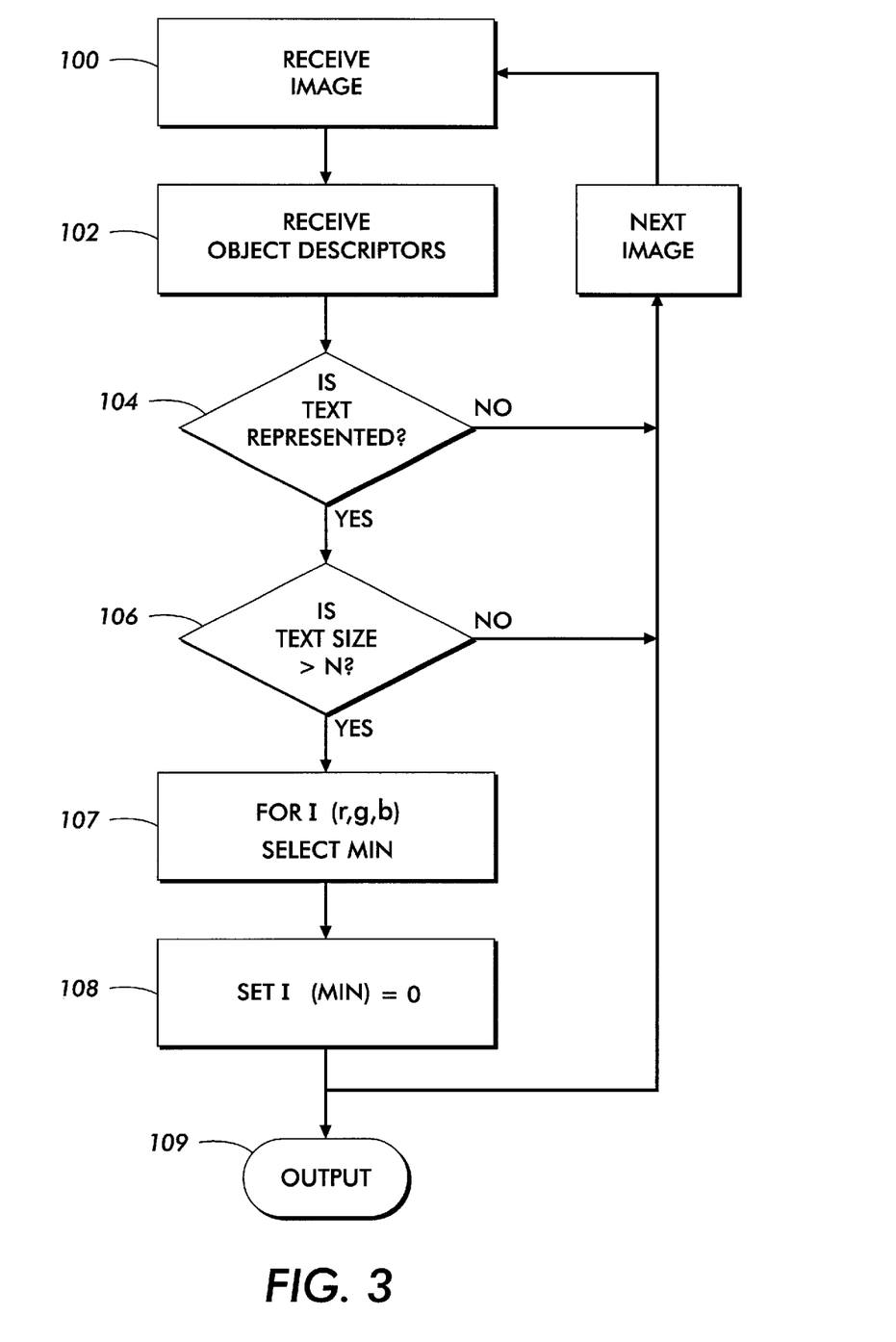
FIG. 3 is a flow chart, describing a process incorporating the present invention.

The flow chart of FIG. 3 illustrates the process, for use particularly with small text: At step 100, the input image is received. At step 102, which may occur simultaneously with step 100, information about the object which the input image represents is received. A decision is made at step 104 as to whether the image represents text or not.

With reference to the decision of block 104, for small text, decision is easily made in a Page Description Language (PDL) processor, such as provided for Postscript systems. In such arrangements, PDL operators identify text regions, with size and font descriptions. At step 106, if identified portions have text/size descriptions in excess of a predetermined value, the text color selected is passed through. In the particular example, this is shown as a "next image" step, where image can refer to an entire image or a predetermined image section or area. However, if the identified portions have text size descriptions less than a predetermined value, the color correction algorithm is implemented. This algorithm is illustrated at steps 107–110 for a case of rendering from a PDL as the following steps: for a halftone cell, l(r,g.b), select the minimum value separation $(I(r,g,b)_{min}$ (107); Set $l(r,g,b)_{min}=0$ (all pixels turned ON in the halftone cell of one separation) (108); output the halftone cells, and go to the next I(r,g.b). The equivalent effect might be implemented by changing the color description of the object inside the PDL, without actual rendering of the PDL to a raster image.

Of course, there could also be provided special halftone cells which reduce jaggedness at densities of other than 100%, by the provision of special halftone structures.

Figure 4:
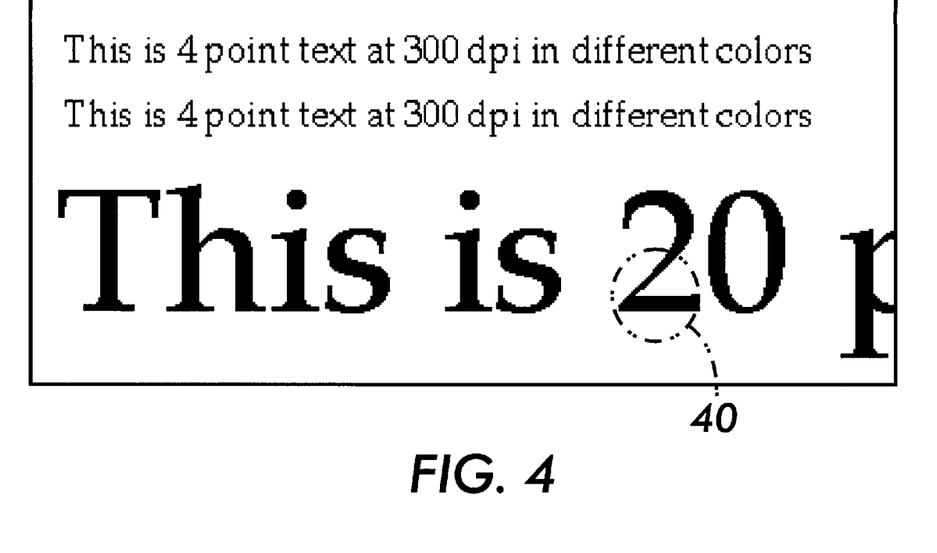
FIGS. 4, 5, and 6 together illustrate the generation of a mask identifying regions of the image requiring halftone protection.

FIG. 4 illustrates the operation of another embodiment of the invention, not limited to text. For text and non-text images, with small features that are desirably protected against damage from halftone use, a mask can be created and applied to the image identifying where corrective action may be taken or not taken. Features can be identified by filters selected to detect size, shape, orientation or color of features to be protected, either alone, or in combination. It is convenient to use a dilation and erosion processes to create a mask to be use in applying color transforms to the image. In this inventive method, the input image is used to dynamically generate a mask of small features. Morphological operations such as erosion and dilation are well known, and discussed, for example, at U.S. Pat. No. 5,048,109 to Bloomberg.

An erosion followed by dilation of the same structuring element is referred to as a morphological opening, meaning that the resulting image will be composed only of shapes that are open by the structuring element. That is, all portions of the image will have been removed except those that can fit the structuring element properly within it. Bilevel opening is a form of shape and size recognition. All features removed or non removed by the open in operation would fall into particular size and shape classes determined by selection of the structuring element. The collection of image features within these classes can be used to construct masks for subsequent processing. In the present case, the erosion and dilation processes need not be performed with the same structuring element, which would lead to masks that may be slightly enlarged or reduced with respect to the input feature.

For our purposes, "erosion" is a morphological operation where pixels within a defined shape (structuring element) are ANDed together in binary (bilevel) images and MINed, possibly with some weighting in gray level image. Similarly, "dilation" is the ORing of pixels within the structuring element for binary images, and the MAX or weight MAX of pixels within a shape for gray-level images.

Converse to opening, there is a morphological operation termed "closing" that may be performed by a dilation followed by an erosion. Closing and comparison to the input image, is performed to find shape features in the background, say, the white portions of an image. In the present invention, we may use different structuring elements, thus we will be performing a generalized form of closing.

Equivalent to opening the foreground is closing the background and vice versa. In our description we may refer to either the operation performed on the background of the image or the foreground.

Figure 5:
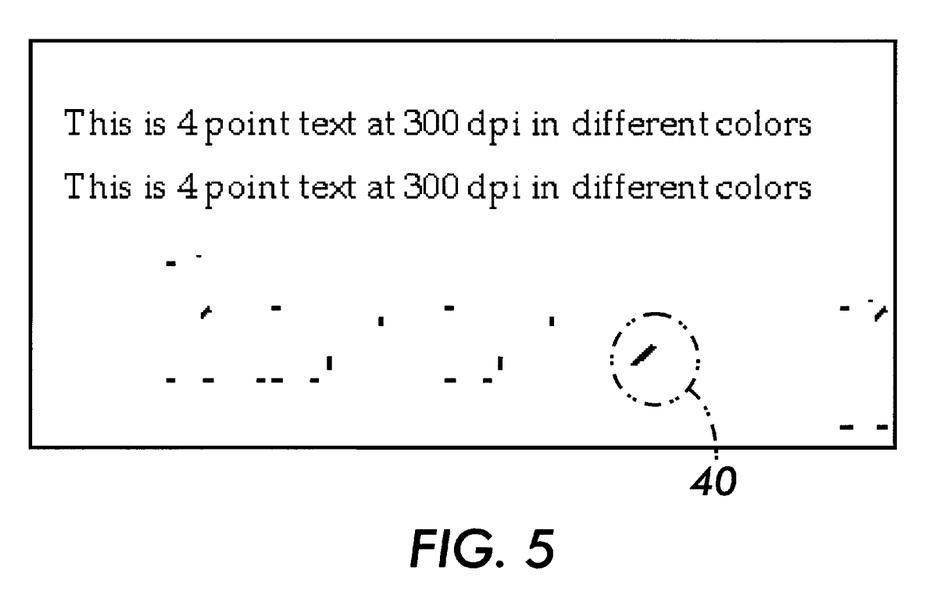
Figure 6:
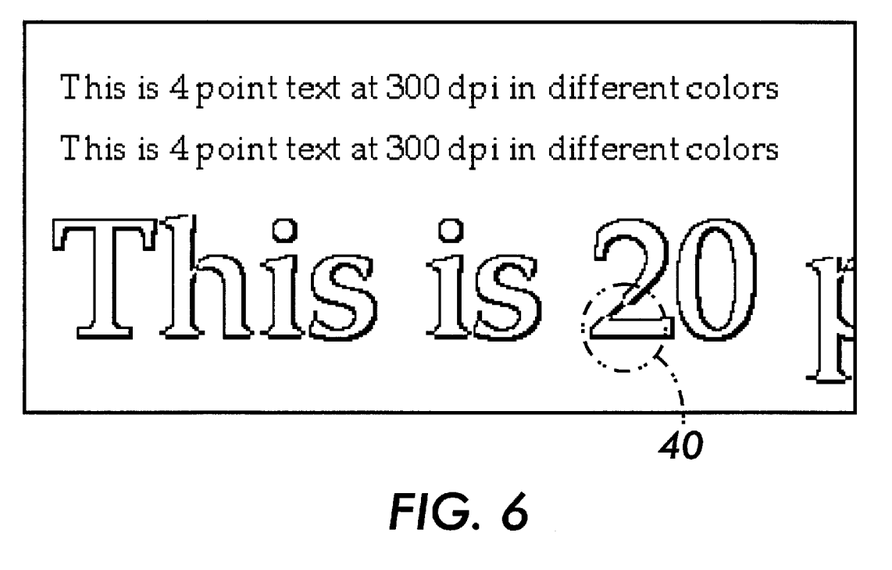

For the present invention, white space is initially dilated, and subsequently eroded (optional background suppression is assumed to be done before dilation), giving a mask that is "ON" whenever an underlying object is larger than the dilation structuring element 200 feature size and "OFF" everywhere else (including in the white space). These mask determination operations may be performed on the grayscale values or on thresholded versions of the image. FIGS. 4 through 6 show examples of the processing outlined above. FIG. 4 shows an example of a raster input image including text in the sizes of 4 point and 20 point. Please note that the text is shown in black in FIG. 4 for illustration purposes and that the original text was color. FIG. 5 shows the mask that was generated from FIG. 4, where black now denotes a pixel that corresponding to a small feature in FIG. 4. It can be seen that the 4 point text of FIG. 4 is faithfully mapped into the mask, as desired for the intended color modification. Also, some other pixels are marked, e.g.: the pixels that correspond to the narrow part of the numeral "2" in the 20 point font area indicated by circle 40 in FIG. 4 and FIG. 5. This will cause part of the numeral "2" to be mapped using one color scheme, whereas another part is mapped using a different scheme. This effect is desirable, since it allows the character to have the accurate color in all areas that are large enough for reproduction, e.g.: in the base of the numeral, while at the same time maintaining the critical line that connects base on top of the numeral. Since human color vision is very insensitive to accurate color reproduction in very fine features, the numeral "2" will be perceived as having a single accurate color, despite the color deviation in the thin connecting line.

FIG. 6 shows a small modification to the method applied in FIG. 5. Here, the dilation/erosion was set so that small text as well as the outline of large text produces a mask. In this case, the small text as well as the outline of the large text will be reproduced in the halftone-protected mode, while the body of large text will be reproduced in standard mode. The effect of this is the enhanced sharpness of even large text. Note that FIG. 6 shows the mask and that the outline of the text in the mask might extend into the background area. To extend the mask beyond the feature, one would use the method: (1) open, (2) take difference with input image to get feature, (3) dilate the feature to get the final mask. Since white paper is rendered identical in both color modes, no adjustment was performed on the mask, however the required adjustment is straightforward to someone skilled in the art.

The mask is then merged with the data (e.g.: an a plane) and a conditional color modification is performed before the data is transferred through the halftoner to the printer for printing.

Figure 7:
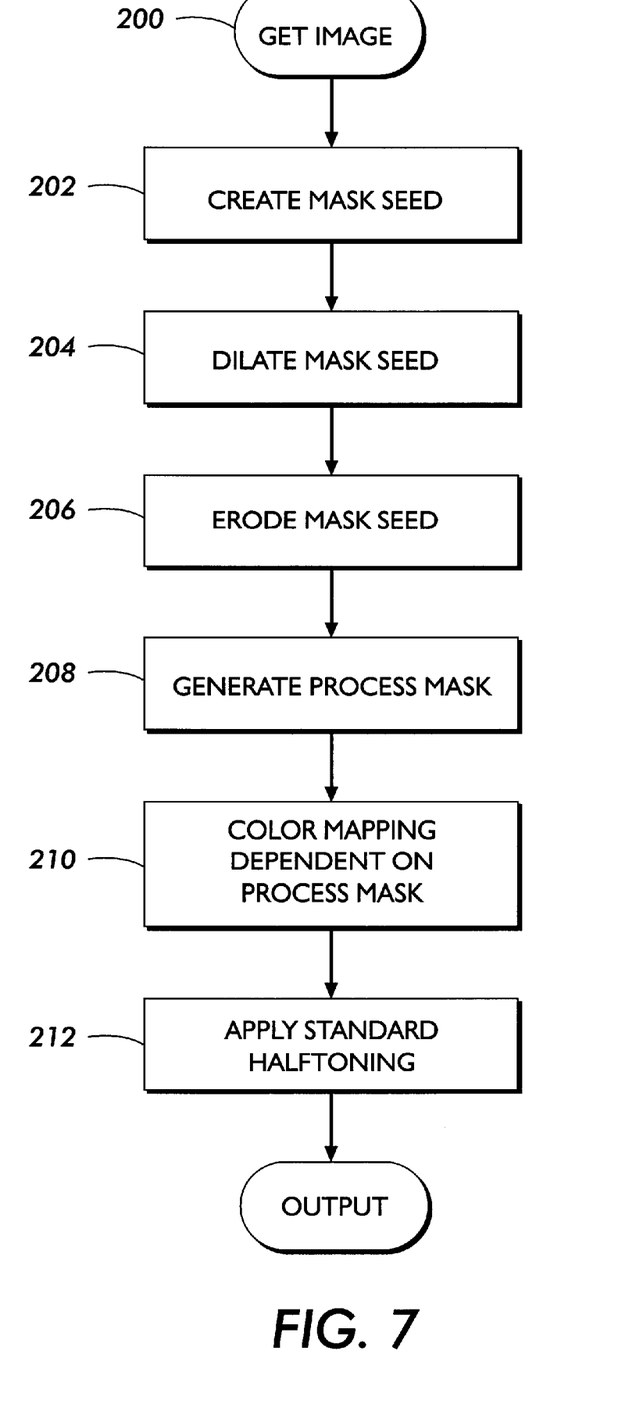
FIG. 7 is a flow chart, describing the process of generating a mask, and using the mask to alter the color transform for the image.

In accordance with this embodiment, and with respect to FIG. 7, image data is received at step 200. At step 202 an image mask seed is created identifying regions of the page that are covered by objects. At step 204 and 206, the mask generation step occurs, with appropriate morphological filtering by dilation and erosion of the mask seed of step 202. At step 208, the process generates a process mask that will be used for switching the color rendering. Note that the halftone characteristics do not need to be switched, eliminating one common cause of image artifacts. At step 210, the color mapping is applied, changing the color of the pixel to have at least one separation in the ON state if the process mask indicates a small feature, and maintaining the original color whenever the process mask does not indicate a small feature. At step 212, the standard halftone is applied, as previously described without the need to switch between different halftones. It should be understood that the proposed feature size dependent color modifications can be performed either on the input r,g,b values before device color mapping, or on the output c,m,y,k values of the device mapping. It is only important that the resulting c,m,y,k values in both cases represent a color that can be produced maintaining fine detail.

While this invention has been described with erosion/dilation filters and filtering, it will of course be understood that other filters or filter order in the class of morphological filters may also work for the intended purpose. Generally, other non-linear filters or template matching filters may also work for the purpose of identifying features in an image which require special attention, for halftone protection, or preferred color rendition.

It should be noted that the steps are described sequentially, but that processing of a subsequent step can commence as soon as there is enough data present for the required computations without the need to process the entire image at each step before moving to the next step.

It will no doubt be appreciated that the present invention may be accomplished with either software, hardware or combination software-hardware implementations.

It should be appreciated that the invention was described as operating on a contone image rather than on a halftone image, but it should be recognized that a halftone image can be input, and descreening or local descreening may be applied prior to implementing the invention.

It should be very clear that general shapes can be modified through the described process, and that accordingly, the invention is not limited to text modification. Orientation of a shape may also be a factor in establish that a feature for modification. For instance, the human visual system has more acuity to vertical and horizontal edges than to diagonal edge. In some cases, perhaps for cost reasons or to avoid certain other processing artifacts, it may be desirable to modify an edge of only chosen orientations. Similarly, the halftone process or marking process may be particularly damaging to features or edges in a particular orientation, and possibly only those features at the orientation would be modified.

It should be appreciated that the present modification mode could be selected as an operation on a job, page, or feature basis. For instance, a user may select a map mode for such processing of a particular page.

It should be appreciated that the processing may be applied to image planes other than those representing colorants. For instance, such operations may be performed on the L* plane (lightness) of an L*a*b* image representation.

It should be appreciated that there are logically equivalent forms of opening and closing, such as direct template matching. The mask determination step could be performed using one of those equivalent forms. Also the mask determination could be performed on a computationally convenient form of the image, such as on one or more thresholded copies of the image.

The invention has been described with reference to a particular embodiment. Modifications and alterations will occur to others upon reading and understanding this specification. It is intended that all such modifications and alterations are included insofar as they come within the scope of the appended claims or equivalents thereof.

What is claimed is:

1. A method for preparing a color document image for reproduction including at least two separations corresponding to colorants for reproduction of the image, and including small feature enhancement of the image, preventing halftoning damage thereto, including detecting small features in said image; and in a detected small feature region, setting any output image signals corresponding to said small feature region to ON in at least one of said at least two separations.

2. The method as described in claim 1, and including selecting said at least one separation because said setting step will have a lesser impact on color represented in the document for said at least one separation, than for any other separation.

3. The method as defined in claim 2, wherein said determining step creates a mask from said image identifying small feature areas of the image, with the following steps:

using erosion and dilation filters of a size selected to identify small text, on said document image, to create a mask identifying small text areas; and selecting areas of the image for halftone damage protection based on said mask.

4. A method for preparing a color document image, including text, for reproduction including at least two separations corresponding to colorants for reproduction of the image, and including small text enhancement of the image, preventing halftoning damage thereto, including determining whether said text is less than a predetermined size; and for text detected to be less than a predetermined size, performing color modification thereon by setting any output image signals corresponding to said text to ON in at least one of said at least two separations.

5. The method as described in claim 4, and including selecting said at least one separation because said setting step will have a lesser impact on color represented in the document for said at least one separation, than for any other separation.

6. The method as defined in claim 4, wherein said determining step takes text size information from a page description language description of said document.

7. The method as defined in claim 4, wherein said determining step creates a mask from said image identifying small text areas of the image, with the following steps:

using erosion and dilation filters of a size selected to identify small text, to create a mask identifying small text areas; and selecting areas of the image for halftone damage protection based on said mask.

8. The method as described in claim 4, wherein said setting step includes the process steps for each pixel find min of red, green, blue set min=0 next pixel where red, green, blue are separations, each separation defined by a set of gray value separation pixel and together defining a set of color pixels;

where min of red, green, blue represents one of said gray value separation pixels which is closest to ON for said color pixel; and where min=0 reflects the gray value separation pixel being turned ON.

9. The method as described in claim 4, wherein said setting step includes the process steps for each pixel determine color set color to a color that produces at least one ON state in the output next pixel.

10. The method as described in claim 4, wherein said setting step includes the process steps for each pixel find max of cyan, magenta, yellow, black set max=1 next pixel where cyan, magenta, yellow, black are separations, each separation defined by a set of gray value separation pixel and together defining a set of color pixels;

where max of cyan, magenta, yellow, black represents one of said gray value separation pixels which is closest to ON for said color pixel; and where max=1 reflects the gray value separation pixel being turned ON.

11. The method as defined in claim 4, wherein said small feature determination step takes text size information from a page description language description of said document as an indicator of a small text size.

12. The method as defined in claim 11 wherein said color modification is performed in a color descriptor associated with the identified small text from a page description language description of said document.

13. A method for preparing a color document image for reproduction including feature protection for image features susceptible to halftoning damage, preventing halftoning damage thereto, including     detecting feature regions in the image susceptible to halftoning damage in said image from image attributes thereof; and     in a detected feature regions, controlling any color transform to prevent halftone damage to said features.

14. The method as described in claim 13, wherein controlling said color transform includes setting at least one color separation to substantial saturation.

15. The method as described in claim 13, wherein controlling said color transform includes setting at least one color parameter in said image color description to saturation.

16. The method as defined in claim 13, wherein said detecting step creates a mask from said image, identifying feature regions of said image requiring halftone protection with the following steps:

filtering said image using erosion and dilation filters selected to identify feature regions requiring halftone protection, and using the filtered image output, to create a mask identifying small text areas; and     selecting areas of the image for halftone damage protection based on said mask.

17. A method of halftoning colored document images, including small features, said method including:

receiving said colored document images, each colored document image defined by at least two separations, each separation in turn defined by gray valued pixels;

identifying in said colored document images, any areas including representations of small features, which would be damaged by halftone representation thereof;

for said small features areas, determining in which of said at least two separations gray valued pixels could be turned substantially ON with minimum color fidelity impact;

turning gray valued pixels substantially ON in said determined separation.

18. A method for preparing a color document image for reproduction including feature protection for image features susceptible to halftoning damage, preventing halftoning damage thereto, including     detecting small feature regions in the image; and     in a detected small feature regions, controlling any color transform to produce a preferred color rendition for the small feature.

19. The method as described in claim 18, wherein controlling said color transform includes setting at least one color separation to substantial saturation.

20. The method as described in claim 18, wherein controlling said color transform includes setting at least one color parameter in said image color description to a maximum.

21. The method as defined in claim 18, wherein said detecting step creates a mask from said image, identifying small feature regions of said image requiring halftone protection with the following steps:

filtering said image with at least one filter selected to identify small feature regions, and using the filtered image output, to create a mask identifying small feature areas; and     selecting areas of the image for preferred color rendition, based on said mask.

\* \* \* \* \*